W. M. ROOP.
WIRE FABRIC MACHINE.
APPLICATION FILED NOV. 29, 1909.

1,103,316.

Patented July 14, 1914.
7 SHEETS—SHEET 4.

Witnesses:
R. E. Hamilton
M. Cox

Inventor,
W. M. Roop,
By F. G. Fischer,
Atty.

W. M. ROOP.
WIRE FABRIC MACHINE.
APPLICATION FILED NOV. 29, 1909.
1,103,316.
Patented July 14, 1914.
7 SHEETS—SHEET 5.
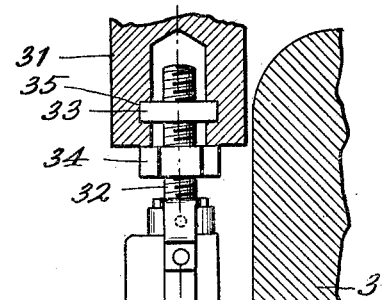
Fig. 5.
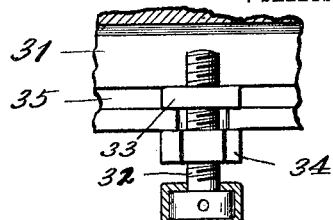
Fig. 6.
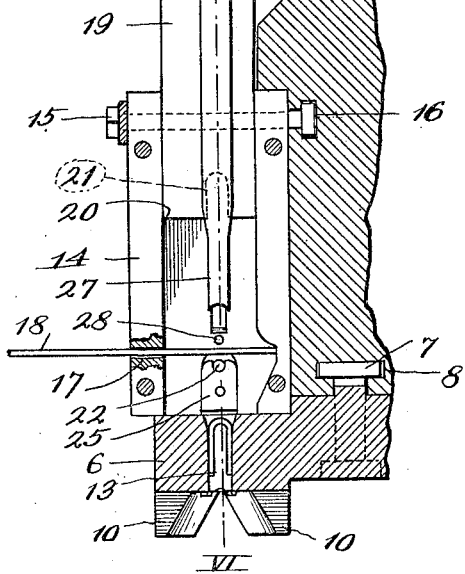
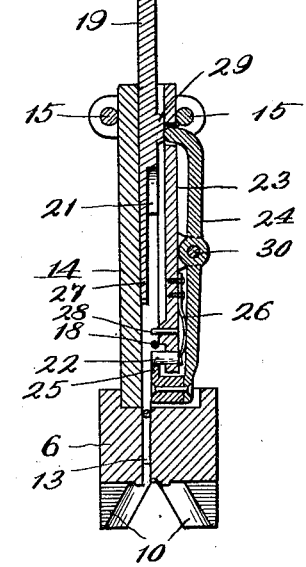
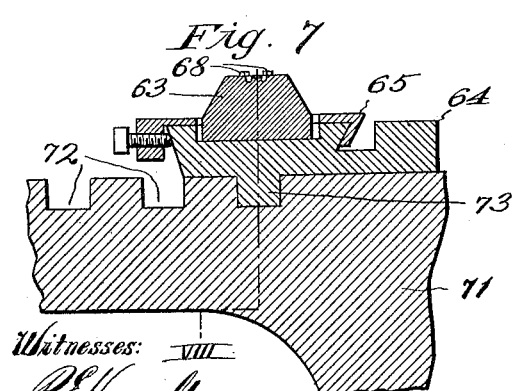
Fig. 7.
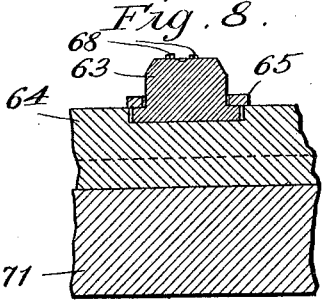
Fig. 8.
Witnesses:
R. E. Hamilton
M. Cox
Inventor,
W. M. Roop,
By F. G. Fischer,
Atty.

W. M. ROOP.
WIRE FABRIC MACHINE.
APPLICATION FILED NOV. 29, 1909.
1,103,316.
Patented July 14, 1914.
7 SHEETS—SHEET 6.
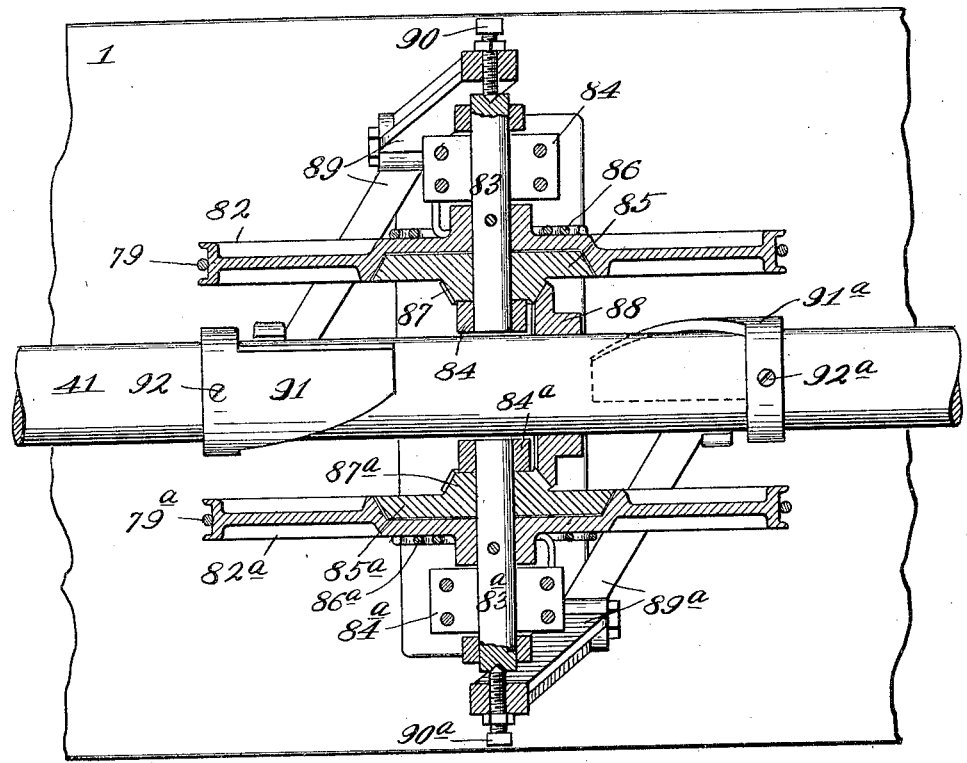
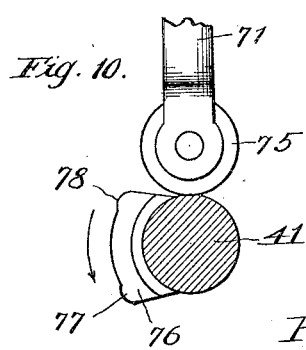
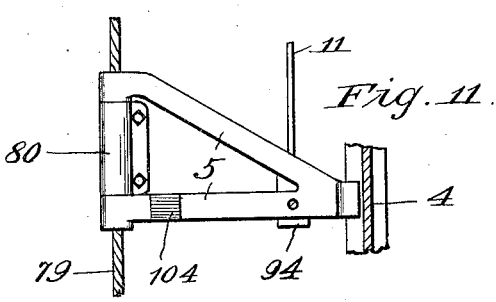
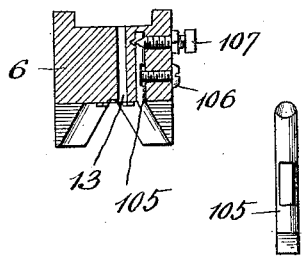
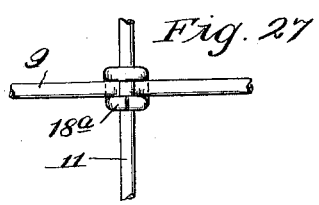
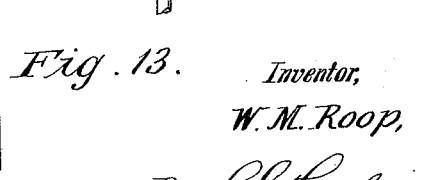
Witnesses:
R. L. Hamilton
M. Cox
Inventor,
W. M. Roop,
By F. G. Fischer,
Atty.

W. M. ROOP.
WIRE FABRIC MACHINE.
APPLICATION FILED NOV. 29, 1909.
1,103,316.
Patented July 14, 1914.
7 SHEETS—SHEET 7.
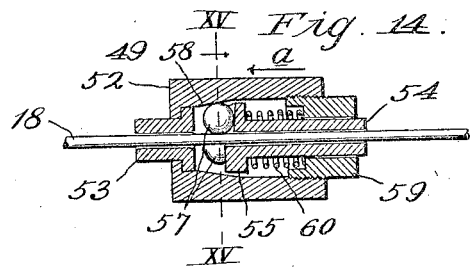
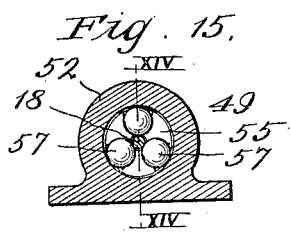
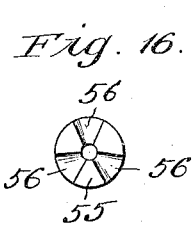
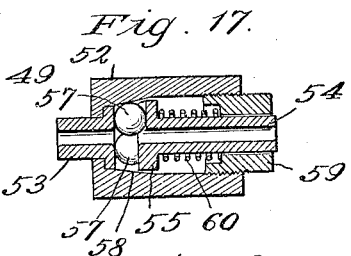
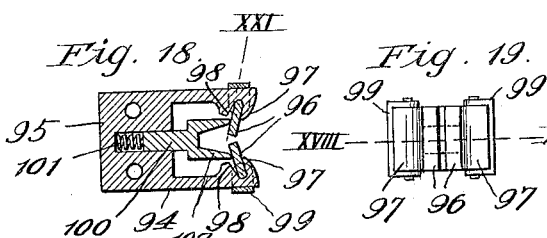
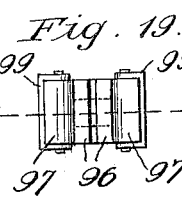
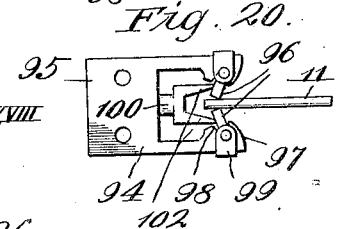
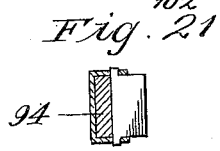
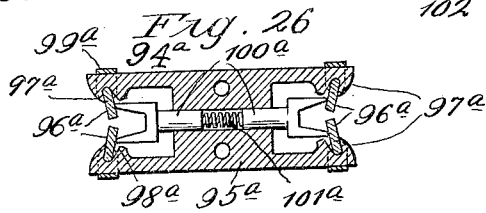
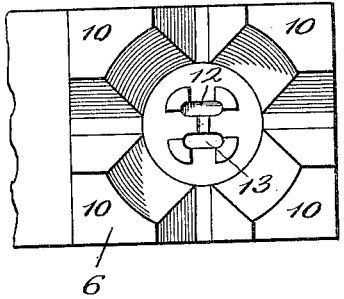
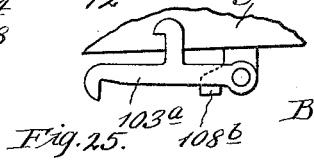

UNITED STATES PATENT OFFICE.

WILLIAM M. ROOP, OF KANSAS CITY, MISSOURI, ASSIGNOR, BY DIRECT AND MESNE ASSIGNMENTS, TO WIRE FABRIC MACHINERY COMPANY, A CORPORATION OF MISSOURI.

WIRE-FABRIC MACHINE.

1,103,316.  Specification of Letters Patent.  Patented July 14, 1914.

Application filed November 29, 1909. Serial No. 530,417.

*To all whom it may concern:*

Be it known that I, WILLIAM M. ROOP, a citizen of the United States, residing at Kansas City, in the county of Jackson and State of Missouri, have invented certain new and useful Improvements in Wire-Fabric Machines, of which the following is a specification.

This invention relates to that class of wire fabric machines which weaves a complete fabric or fence ready to be secured to the posts in a body.

My object is to provide means for automatically carrying the woof or stay-wires across the warp or strand wires and placing them thereon at regular intervals, severing said stay wires, connecting the wires at their intersecting points by staples one or more rows of which are clenched around said intersecting points across the entire width of the fabric at one operation, and means for intermittently carrying the fabric through the machine as the weaving operation proceeds.

Figure 1:
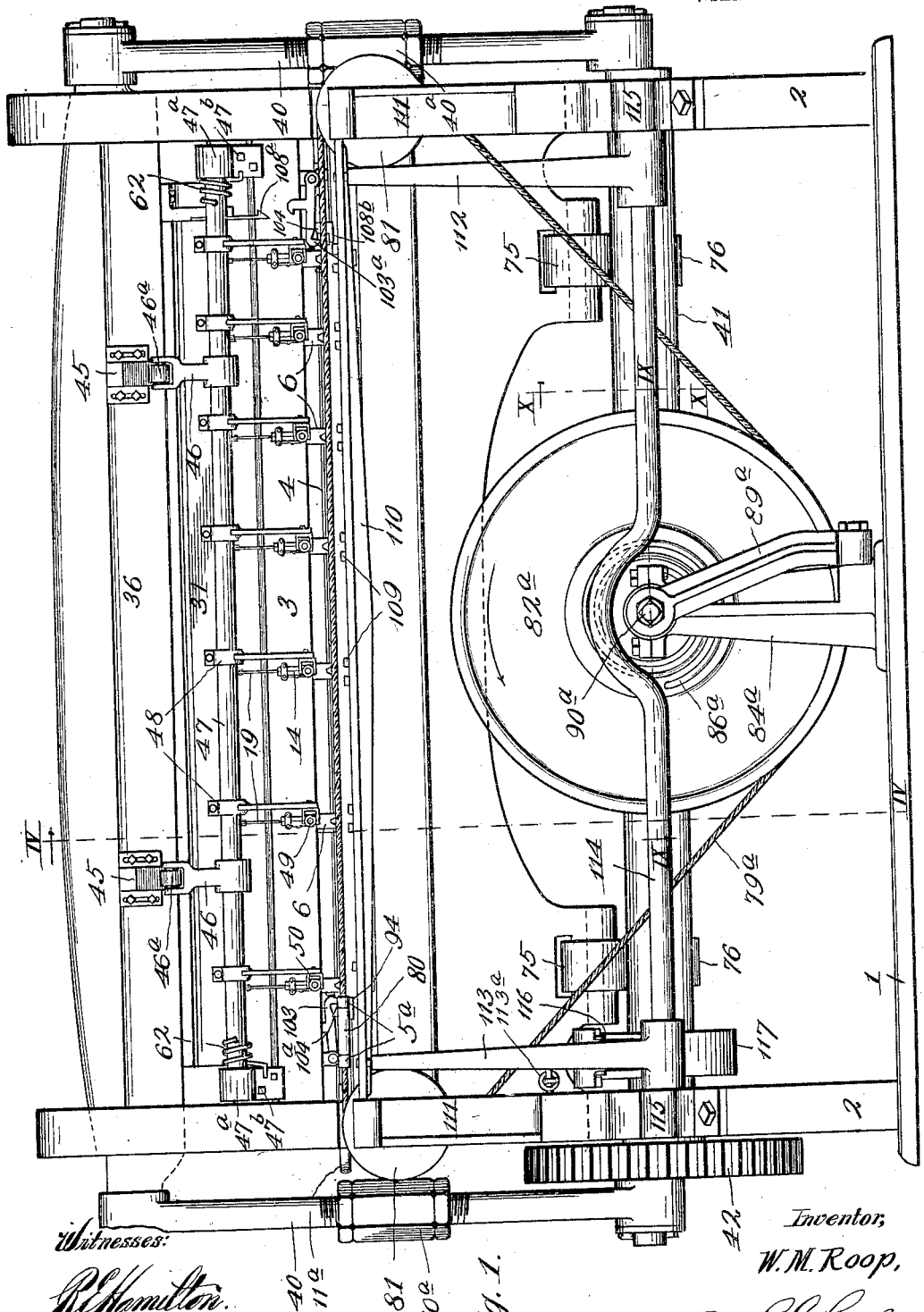
Figure 2:
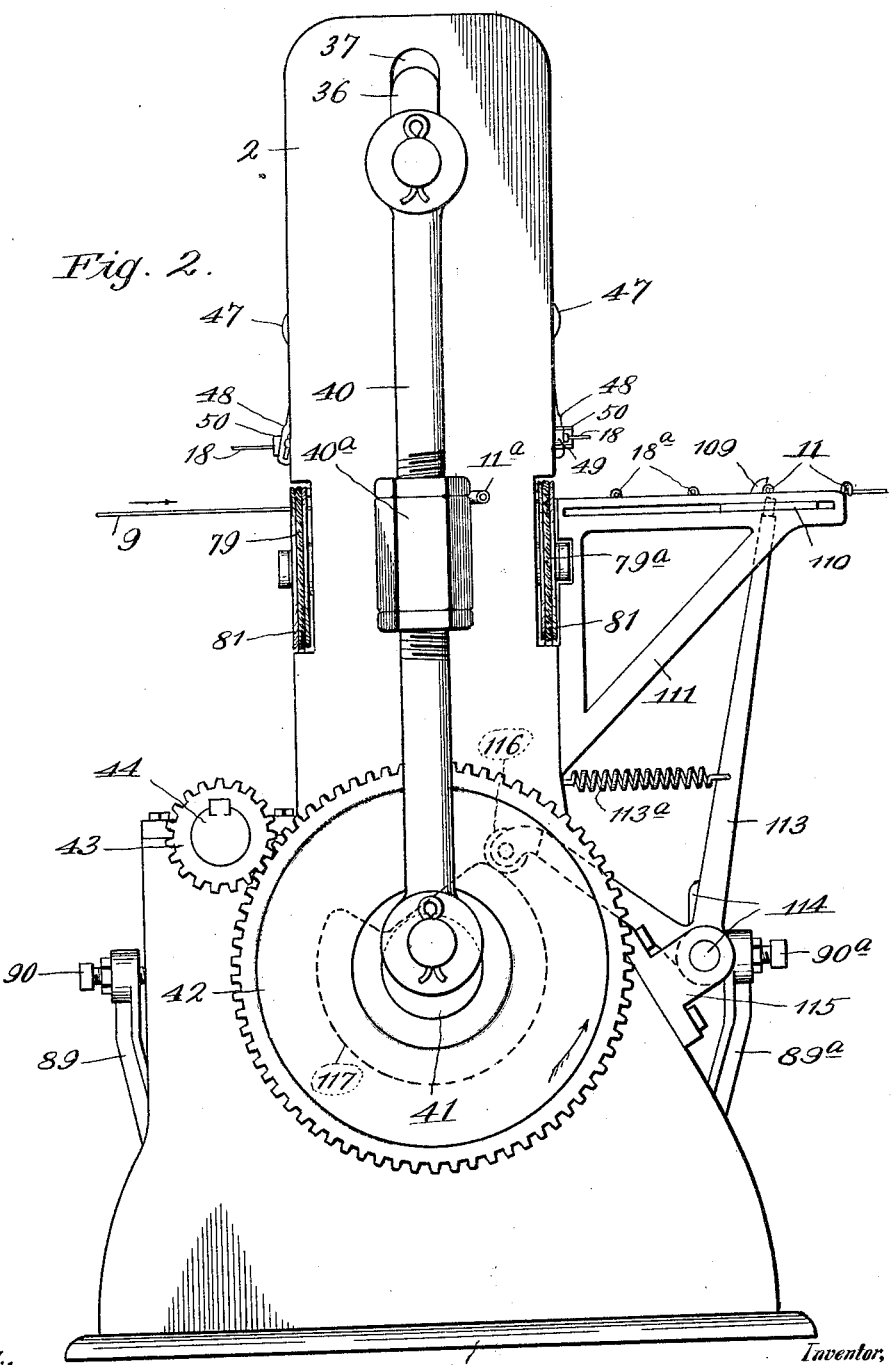
Figure 3:
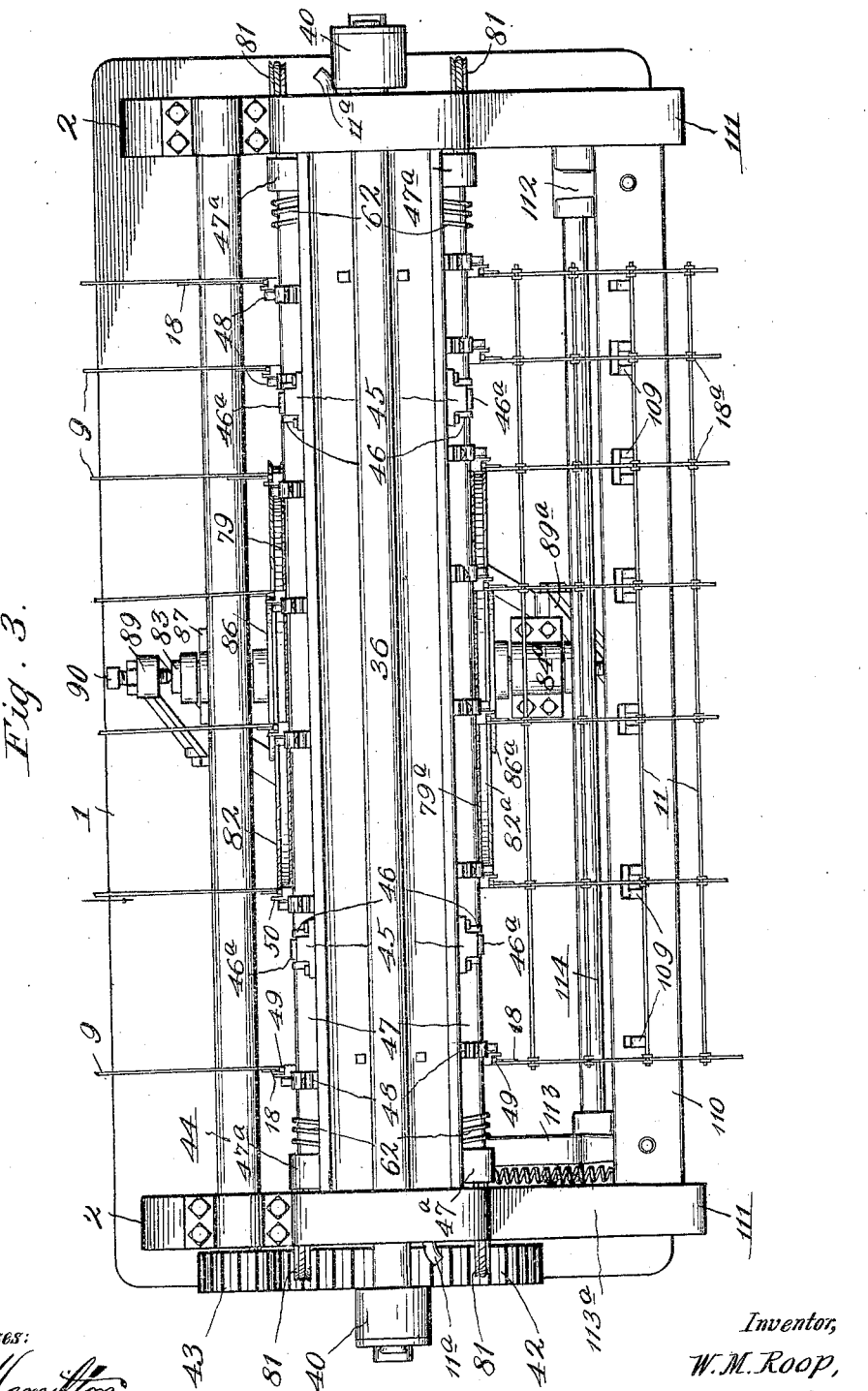
Figure 4:
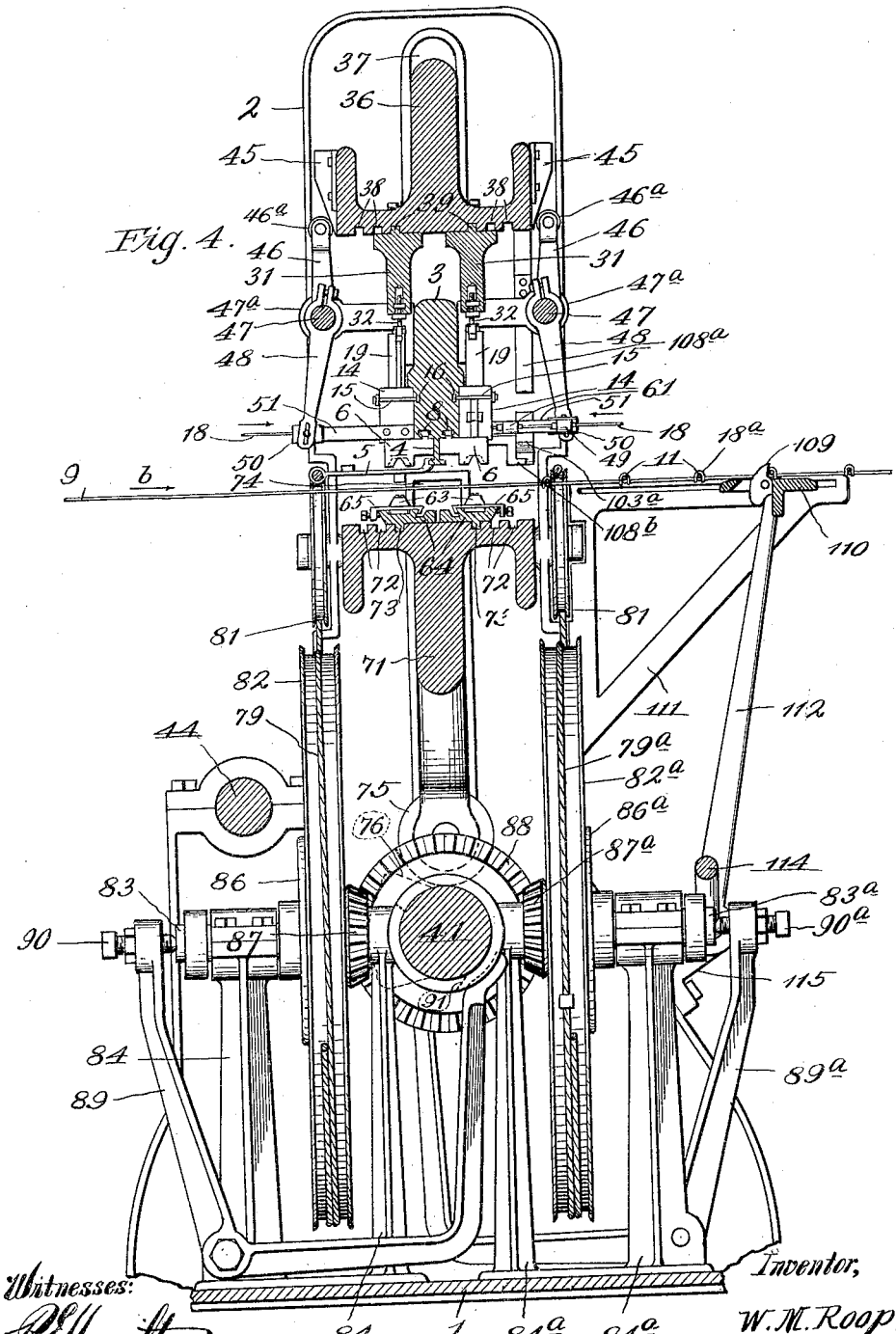

Referring now to the accompanying drawings, which illustrate the invention: Figure 1 is a rear elevation of the machine. Fig. 2 is a side elevation of the machine. Fig. 3 is a plan view of the machine. Fig. 4 is a vertical cross section on line IV—IV of Fig. 1. Fig. 5 is an enlarged vertical section of a staple-producing device and adjacent parts of the machine. Fig. 6 is a vertical section on line VI of Fig. 5. Fig. 7 is an enlarged cross section of one of the lower dies and adjacent parts of the machine. Fig. 8 is an irregular vertical section on line VIII of Fig. 7. Fig. 9 is a horizontal section on line IX—IX of Fig. 1, showing the gearing for imparting motion to the stay-wire carriages. Fig. 10 is a broken cross section of the main shaft and a lower cross-head of the machine, on line X—X of Fig. 1. Fig. 11 is a plan view of one of the stay-wire carriages. Fig. 12 is a plan view of one of the upper dies and a blade carried thereby for cutting the stay-wires into proper lengths. Fig. 13 is an enlarged detail of one of the blades for severing the stay-wires. Fig. 14 is a longitudinal section of one of the staple-wire carriers on line XIV—XIV of Fig. 15. Fig. 15 is a cross-section on line XV—XV of Fig. 14. Fig. 16 is a detail front elevation of a plunger forming part of each staple-wire carrier. Fig. 17 is a longitudinal section of one of the staple-wire carriers, showing its internal parts in different positions to that shown in Fig. 14. Fig. 18 is a horizontal section of one of the stay-wire grippers on line XVIII—XVIII of Fig. 19. Figs. 19 and 20 are front and plan views, respectively, of one of the stay-wire grippers. Fig. 21 is a section on line XXI of Fig. 18. Fig. 22 is a plan view of one of the lower dies. Fig. 23 is an inverted plan view of one of the upper dies. Fig. 24 is an end view of one of the staple-wire carriers and its actuating crank, the latter being in section. Fig. 25 is a side elevation of a latch employed in locking one of the stay-wire carriages while the stay-wires are being united to the strand wires. Fig. 26 is a horizontal section of a modified form of stay-wire gripper, and Fig. 27 is a detail showing a stay-wire and a strand wire united at their intersecting points.

In carrying out the invention I employ a frame comprising a base 1, a pair of standards 2, and a shoe 3, terminating at its underside in a T-rail 4, which is slidingly-engaged by the inner bifurcated terminals of a pair of carriages 5 and 5ª, respectively, employed in conducting the stay-wires across the strand wires from opposite sides of the machine.

6 designates two gangs of upper dies abutting at their inner and upper ends against the T-rail 4 and the underside of the shoe 3, respectively, to which latter they are adjustably-secured by bolts 7 depending from a pair of T-slots 8 extending longitudinally of the shoe so that the dies may be adjusted longitudinally thereof, to accommodate any desired spacing of the strand wires 9. The underside of each die 6 has four downwardly-tapering lugs 10 to guide the strand wires 9 and the stay wires 11 in proper position relative to a segmental groove 12 in the underside of the die, and a channel 13 extending vertically through said die, see Figs. 5 and 23. Channels 13 communicate with the interior of two gangs of housings 14, adjustably-secured to opposite sides of shoe 3 by bolts 15, the inner ends of which are arranged in T-slots 16 extending longitudinally of the shoe, so that the housings 14 may be adjusted vertically over the dies 6.

Housings 14 form parts of staple-producing and clenching devices, and are provided with inlets 17 to receive the forward ends of staple-wires 18 from which the staples 18$^a$ are produced, to unite the strand wires and the stay-wires at their intersecting points. Each staple-producing and clenching device consists of a plunger 19 provided with a cutting-edge 20 and a recessed portion 21; a pin 22 projecting inwardly from the face-plate 23 of the housing; a lever 24 provided at its lower end with a bifurcated member 25 straddling pin 22; a spring 26 interposed between the face-plate 23 and the lower portion of lever 24 to normally press said lower portion outward, and an extension 27 depending from the plunger. As the plunger descends the cutting-edge 20 severs that portion of wire 18 extending into the housing from the source of supply, and the recessed portion 21 bends the severed portion of the wire over pin 22 into the form of a staple. As the plunger ascends to the position shown in Fig. 5, the staple resting upon pin 22 is prevented from being carried upward in the recessed portion 21 of the plunger by a stud 28 arranged above said pin, and when lug 29 strikes the inturned end of lever 24, it causes the same to rock upon its fulcrum point 30 and push the staple from pin 22 into the path of extension 27. After the first staple has been produced, each downward stroke of the plunger results in producing a staple and forcing the preceding one into the dies and around the intersecting points of the stay-wires and strand wires.

Plungers 19 are carried by a pair of cross-bars 31, to which they are secured by depending screws 32 and jam-nuts 33 and 34. Screws 32 are swiveled to the plungers so that they may be adjusted vertically to compensate for the wear upon said plungers. Nuts 33 are arranged in grooves 35 extending longitudinally of bars 31 so that the plungers may be adjusted laterally with the housing 14.

Bars 31 are carried by an upper reciprocating cross-head 36 extending through vertical slots 37 in the upper portions of standards 2. Cross-head 36 is provided at its underside with parallel longitudinal grooves 38 to receive the longitudinal tongues 39 on the upper sides of the cross-bars 31 to prevent accidental lateral movement of the same. By providing a plurality of grooves 38 for each tongue 39 the cross-bars 31 may be adjusted farther apart or closer together to accommodate any desired spacing of the stay-wires, it, of course, being understood that the upper dies and the staple-producing and clenching devices are to be adjusted therewith, and in order that said adjustments may be readily accomplished, I provide interchangeable shoes 3 of different widths.

Cross-head 36 is actuated by a pair of connecting bars 40, and a crank-shaft 41, journaled in standards 2 and provided near one end with a large cog-wheel 42 driven by a pinion 43 mounted upon a drive-shaft 44, also journaled in standards 2. Connecting-bars 40 are each made in two sections united by a coupling 40$^a$ whereby each connecting-bar may be lengthened to adjust the cross-head toward the plungers and thus assist in compensating for the wear thereon.

45 designates a pair of wedge-members on each side of the cross-head 36 for actuating two sets of arms 46 fixed to a pair of rock-shafts 47, mounted in brackets 47$^a$ and provided with gangs of cranks 48, whereby the staple-wire carriers 49 are moved toward the staple-producing and clenching devices to feed the staple-wires thereto on each downward stroke of the cross-head 36, see Fig. 4. Arms 46 are provided with rollers 46$^a$ to reduce the friction incident to engagement with the wedge members 45, which are vertically-adjustable on the cross-head, so that they may be set to engage rollers 46$^a$ at the proper time. Brackets 47$^a$ are removably-secured to shoe 3 by bolts 47$^b$, so that they may be removed when one shoe is to be interchanged for another. Carriers 49 are secured to guides 50 having pin-and-slot connections with cranks 48 and reciprocably-mounted upon arms 51, projecting in opposite directions from the housings 14. Each carrier 49 (Figs. 14 to 17) consists of a shell 52; a nipple 53 loosely-extending through the rear end of said shell to hold the staple-wire 18 centrally therein; a tubular plunger 54 through which the staple-wire extends and which is provided at its inner end with a circular head 55 having radial ball-seats 56; balls 57 engaging the staple-wire 18, the seats 56, and the rearwardly-tapering interior wall 58 of shell 52; a plug 59, adjustably engaging the inner front portion of shell 52 and forming a support for the plunger 54, and an expansion spring 60 interposed between plug 59 and head 55 for the purpose of pressing plunger 54 backward to hold the balls 57 into engagement with the staple-wire 18 and the tapering wall 58.

When the carrier moves forward toward its respective staple-producing and clenching device, the resistance offered by the staple-wire retards the forward movement of the plunger 54, and causes it to wedge the balls 57 firmly against the inclined wall 58 and said staple-wire, so that the latter will be pushed into the housing 14. When the carrier moves backward in the direction of arrow $a$, Fig. 14, to get another grip upon the wire 18, balls 57 are retarded by said wire, and in turn retard the forward movement of plunger 54, which permits the balls to roll forward upon the tapering wall 58 and release the wire. The wires 18 are held from backward movement by holders 61, secured upon arms 51 in advance of the carriers, see Fig. 4. The holders 61 are identical in construction to the carriers 49, but being stationary act reversely to said carriers; in other words, when the carriers move forward they grip the wires 18, and in pushing the same forward cause the balls of the holders to release said wires, and when the carriers move backward they release the wires as above described, while the holders secure said wires from backward movement with said carriers. When the cross-head 36 moves upward and carries the wedge-members 45 out of engagement with arms 46, the latter are restored to normal by springs 62, secured to shafts 47 and brackets 47$^a$.

63 designates two lower gangs of dies, arranged vertically beneath the upper dies 6. The upper portions of dies 63 are conical in form to snugly fit the downwardly-tapering lugs 10 when raised into contact therewith, and in order that the lower dies may move into line with the upper dies when engaged by lugs 10, I loosely mount said lower dies in shoes 64, provided with movable caps 65 for holding the dies in position thereon, the opening through said caps being slightly larger than the upper portions of the dies, to permit the same to move into alinement with the upper dies, as described. Each die 63 is provided at its upper surface with segmental grooves 66 and 67 arranged at rightangles to groove 12 and channel 13 in the companion upper die. The ends of grooves 66 and 67 are arranged to register with the groove 12 and channel 13, so that a staple may be forced through the same and around the intersecting portions of a stay-wire and strand wire to unite the same as shown in Fig. 27. Each die 63 is provided at its upper side with lugs 68 (Fig. 22) spaced apart to form a channel 69 for one of the strand wires 9, and a channel 70 for one of the stay-wires 11, so that said wires will not slip out of position while being raised into engagement with the companion upper die.

Shoes 64 are adjustably-mounted upon a cross-head 71, so that the lower set of dies may be adjusted laterally with the upper set when the stay wires are to be spaced closer together or farther apart, and in order that the shoes may be firmly held in position upon said cross-head 71, I provide the upper portion of the latter with a plurality of longitudinal grooves 72, adapted to receive the tongues 73 integral with the bottoms of shoes 64. Cross-head 71 is reciprocally-mounted in standards 2, provided with slots 74 to receive the ends of said cross-head, which is provided at its underside with a pair of rollers 75, resting upon shaft 41 in the path of a pair of cams 76, whereby the cross-head is raised to carry the lower dies into engagement with the upper dies at each revolution of said shaft.

Cams 76 have raised terminals 77 and 78, the former of which raise the lower dies firmly into engagement with the upper dies when the staples are entering the grooves of said lower dies, while the raised terminals 78 raise the lower dies firmly into engagement with the upper dies to clench the staples after being forced around the intersecting portions of the strand wires and stay-wires. By having the greater portion of the periphery of the cams lower than the terminals 77 and 78, the lower dies are permitted to move downward slightly from the upper dies while the staples are being forced around the intersecting portions of the strand wires and the stay wires, and hence considerable friction is obviated during said operation.

79 and 79$^a$ designate two cables upon which the carriages 5 and 5$^a$, respectively, are swiveled, but made to travel therewith by clamps 80 firmly secured to the cables. Said cables pass around guide-sheaves 81 and are wound upon drums 82 and 82$^a$, rigidly mounted upon countershafts 83 and 83$^a$, slidably and rotatably-mounted in bearings 84 and 84$^a$, respectively.

Alternate rotary motion is imparted to drums 82 and 82$^a$ by means of friction clutches 85 and 85$^a$ and coil springs 86 and 86$^a$, respectively. Each coil spring is secured at its ends to its respective drum and the adjacent bearing. Clutches 85 and 85$^a$ are loosely-mounted upon shafts 83 and 83$^a$, and are constantly driven by integral gears 87 and 87$^a$, respectively, which in turn are driven in opposite directions to each other by a bevel gear 88, rigidly mounted upon shaft 41, Fig. 9. Shafts 83 and 83$^a$ are simultaneously slid toward each other to throw the drums into engagement with their respective friction clutches by means of a pair of substantially U-shaped levers 89 and 89$^a$, pivoted to the adjacent bearings 84 and 84$^a$ and provided at their outer ends with set-screws 90 and 90$^a$ which engage the ends of the shafts 83 and 83$^a$, respectively. The drums are forced out of engagement with their respective clutches when relieved of the inward pressure of the shafts, by the centrifugal force exerted thereon by said clutches.

Levers 89 and 89$^a$ are actuated by cams 91 and 91$^a$, respectively, which taper toward their adjacent ends and are adjustably mounted upon shaft 41 to which they are secured by set-screws 92 and 92$^a$, respectively, so that they may be set to engage the levers at the proper time.

94 designates two grippers, one being secured to the underside of carriage 5, and the other to the underside of carriage 5ª, for the purpose of seizing the stay-wires 11 and carrying them across the strand-wires 9 from opposite sides of the machine. Each gripper (Fig. 18) consists of a frame 95 provided at its bifurcated forward end with a pair of pivotally-mounted jaws 96, the movements of which are limited by stops 97 and 98, integral with the bifurcated end of the frame, in which the jaws are held by U-shaped clips 99. Jaws 96 are normally held against stops 97 by a plunger 100 mounted in a recess in frame 95, and normally pressed outward by an expansion spring 101. The forward end 102 of the plunger is bifurcated to engage both jaws and also leave space to receive the free end of the stay-wire 11 when the gripper engages the same.

When the grippers are carried to opposite sides of the machine, the resistance of the stay-wires upon the jaws cause the same to bite said stay-wire and carry them therewith. Upon arriving at opposite sides of the machine, carriages 5 and 5ª are held stationary by gravity latches 103 and 103ª, which engage the abrupt sides of the triangular lugs 104 and 104ª on the upper sides of carriages 5 and 5ª, respectively. While the carriages are at rest, the lower dies 63 are carried upward into engagement with the upper dies, the two endmost of which are provided with blades 105, that sever the stay-wires from their sources of supply and also from the grippers 94. Blades 105 are adjustably-secured to their respective dies by screws 106 and 107. The strand wires and stay-wires are then stapled together, after which hooks 108 and 108ª, which have been carried down into engagement with the latches 103 and 103ª, respectively, by the cross-head 36, lift said latches out of engagement with the lugs on the carriages and permit the latter to be returned to their initial positions by springs 86 and 86ª and the intervening mechanisms. As the hooks 108 and 108ª move upwardly they pass out of engagement with the latches and permit the same to drop upon stops 108ᵇ, which support the latches in position to engage the carriages 5 and 5ª when they carry the succeeding stay-wires across the strand wires. When the carriages approach the ends of their return movements, jaws 96 strike the free ends of the stay-wires and are pushed inwardly thereby to the position shown in Fig. 20, so that when the carriages again move to the opposite sides of the machine, said jaws will bite the stay-wires and carry the same therewith. The ends of the stay-wires are held in position to be seized by the grippers by tubes 11ª extending through the standards 2. After each pair of stay-wires have been stapled to the strand wires, the completed portion of the fabric is carried forward in the direction of arrow b Fig. 4, by a plurality of fingers 109, pivotally secured to a carrier 110, reciprocably-mounted in a pair of brackets 111, projecting from the rear sides of standards 2. Carrier 110 is actuated by an arm 112, a bell-crank lever 113, and a retractile spring 113ª connected at its ends to said lever and the adjacent part of the machine frame. Arm 112 and bell-crank lever 113 are fixed to a rock-shaft 114, mounted in a pair of bearings 115, and bent upwardly to clear the countershaft 83ª. Bell-crank lever 113 is provided at the free end of its lower arm with a roller 116 engaging a cam 117 mounted upon shaft 41 and whereby the lever is swung forwardly to the position shown in Fig. 2.

In Fig. 26 I have shown a double-acting gripper 94ª adapted to carry a stay-wire across the strand wires in each passage across the machine instead of in every other passage as does the preferred form of gripper 94. Gripper 94ª consists of a frame 95ª; a pair of jaws 96ª mounted in a clip 99ª at each end of frame 95ª; stops 97ª and 98ª on the frame to limit the movement of the jaws; plungers 100ª yieldingly-mounted in frame 95ª, and an expansion spring 101ª interposed between the plungers to force the same against the jaws.

The operation briefly stated is as follows: After the first set of staples have been completed and the upper and lower gangs of dies engage the intersecting strand wires, and stay-wires, said staples are forced around the intersecting points by the plungers 19, which are forced downward by the upper cross-head 36. After the stay-wires have been secured to the strand-wires, the fabric is moved forward by the carriers 110 and two more stay-wires are carried across the strand-wires by the carriages 5 and 5ª, after which the last mentioned stay-wires are secured to the strand-wires in the same manner as the two preceding stay-wires.

Having thus described my invention, what I claim is:

1. In a wire fence machine, a rock-shaft, an arm fixed thereto, a bell-crank lever also fixed to said rock-shaft, a rotary cam for actuating said bell-crank lever, and a carrier consisting of a reciprocably-mounted bar actuated by the arm and the bell-crank lever, and means pivotally-connected to said bar adapted to engage and carry the fence wires forward.

2. In a wire fence machine, a rock-shaft, an arm fixed thereto, a bell-crank lever also fixed to said rock-shaft, a rotary cam for moving said lever in one direction, resilient means for moving the lever in the opposite direction, brackets secured to the rear side of the machine frame, and a carrier consisting of a bar reciprocably-mounted in said carrier and actuated by the bell-crank lever, and means carried by said bar to engage and carry the fence wires forward.

3. In a wire fence machine, stapling devices for connecting the fence wires at their intersecting points, and a carrier for moving the fence wires forward between the stapling operations consisting of a reciprocating bar, and fingers pivotally-connected to said bar to engage and carry the fence wires forward.

4. A machine for producing wire fabric of strand and stay wires, consisting of means for carrying the stay wires in position upon the strand wires, means for stapling the strand and the stay wires together at their intersecting points, and a carrier for moving the fabric forward between the stapling operations consisting of a reciprocating bar, and means carried by said bar to engage and carry the fence wires forward.

5. In a machine for producing wire fabric of strand and stay wires, a gripper for seizing and carrying each stay wire into position upon the strand wires and consisting of a frame, a pair of jaws movably-mounted in said frame to grip the stay wire, and yielding means carried by the frame to hold said jaws in engagement with the stay wire.

6. In a machine for producing wire fabric of strand and stay wires, a gripper for seizing and carrying each stay wire into position upon the strand wires and consisting of a frame, a pair of jaws movably-mounted in said frame to grip the stay wire, means for limiting the opening and closing movements of said jaws, a plunger mounted in the frame and provided with a bifurcated terminal to engage the jaws, and resilient means for forcing said plunger against the jaws to normally hold the same in closed position.

7. In a machine for producing wire fabric of strand and stay wires, a gripper for seizing and carrying each stay wire into position upon the strand wires and consisting of a frame, a pair of jaws movably-mounted in said frame to grip the stay wire, yielding means carried by the frame to hold said jaws in engagement with the stay wire, and a reciprocable carriage for conducting the gripper back and forth over the strand wires.

8. In a machine for producing wire fabric of strand and stay wires, a gripper for seizing each stay wire, a carriage upon which said gripper is mounted, a cable for conducting said carriage back and forth across the strand wires, and means for imparting alternating motion to said cable.

9. In a machine for producing wire fabric of strand and stay wires, a gripper for seizing each stay wire, a carriage upon which said gripper is mounted, a cable for conducting said carriage back and forth across the strand wires, a drum to which said cable is secured, and means for imparting alternating rotary motion to said drum.

10. In a machine for producing wire fabric of strand and stay wires, a gripper for seizing each stay wire, a carriage upon which said gripper is mounted, a cable for conducting said carriage back and forth across the strand wires, a drum to which said cable is secured, a clutch for driving said drum in one direction, and resilient means for driving said drum in an opposite direction.

11. In a machine for producing wire fabric of strand and stay wires, a gripper for seizing each stay wire, a carriage upon which said gripper is mounted, a cable for conducting said carriage back and forth across the strand wires, a drum to which said cable is secured, a clutch for driving said drum in one direction, a shaft adapted to slide and rotate in its bearings and to which the drum is fixed, a lever for sliding said shaft to carry the drum in and out of engagement with the clutch, a lever for actuating said shaft, a rotary cam for actuating said lever, and means for driving the drum in an opposite direction when disengaged from the clutch.

12. In a machine for producing wire fabric of strand and stay wires, a gripper for seizing each stay wire, a carriage upon which said gripper is mounted, a cable for conducting said carriage back and forth across the strand wires, a drum to which said cable is secured, a clutch for driving said drum in one direction, a shaft adapted to slide and rotate in its bearings and to which the drum is fixed, a lever for sliding said shaft to carry the drum in and out of engagement with the clutch, a lever for actuating said shaft, a tapered cam for actuating said lever, a rotary shaft upon which said cam is adjustably-mounted, and means for driving the drum in an opposite direction when disengaged from the clutch.

13. In a machine for producing wire fabric of strand and stay wires, a pair of grippers for seizing and carrying two stay wires into position upon the strand wires, a pair of carriages upon which said grippers are mounted, a rail upon which the inner ends of said carriages travel, cables to which the outer ends of said carriages are connected, drums to which said cables are secured, guide sheaves for conducting said cables to said drums, and means for imparting alternating rotary motion to said drums.

14. In a machine for producing wire fabric of strand and stay wires, a gripper for seizing each stay wire, a carriage upon which said gripper is mounted, a cable having an alternating motion for conducting the carriage to and fro over the strand wires, means for locking said carriage immediately after a stay wire has been carried across the strand wires, means for severing the stay wire from the source of supply while the carriage is in locked position, and means for disengaging the locking means from said carriage after the stay wire has been severed.

15. In a machine for producing wire fabric of strand and stay wires, a gripper for seizing each stay wire, a carriage upon which said gripper is mounted, a cable having an alternating motion for conducting the carriage to and fro over the strand wires, means for locking said carriage immediately after a stay wire has been carried across the strand wires, means for severing the stay wire from the source of supply while the carriage is in locked position, means for disengaging the locking means from said carriage after the stay wire has been severed, and means for securing the stay wire to the strand wires.

16. In a machine for producing wire fabric of strand and stay wires, a gripper for seizing each stay wire, a carriage upon which said gripper is mounted, a cable having an alternating motion for conducting the carriage to and fro over the strand wires, a latch for locking said carriage immediately after a stay wire has been carried across the strand wires, blades for severing the stay wire from the gripper and the source of supply, and a vertically-movable hook for disengaging the latch from the stay wire after the same has been severed.

17. In a machine for producing wire fabric of strand and stay wires, a gripper for seizing each stay wire, a carriage upon which said gripper is mounted, a cable having an alternating motion for conducting the carriage to and fro over the strand wires, a latch for locking said carriage immediately after a stay wire has been carried across the strand wires, blades for severing the stay wire from the gripper and the source of supply, a hook for disengaging the latch from the carriage after the stay wire has been severed, and a vertically-movable cross-head carrying said hook.

18. In a machine for producing wire fabric of strand and stay wires, a gripper for seizing each stay wire, a carriage upon which said gripper is mounted, a cable having an alternating motion for conducting the carriage to and fro over the strand wires, a latch for locking said carriage immediately after a stay wire has been carried across the strand wires, blades for severing the stay wire from the gripper and the source of supply, dies for gripping the stay wire and the strand wires at their intersecting points, two of said dies carrying the blades, plungers coöperating with the dies in forcing ties around the stay and strand wires at their intersecting points, and means movable with the plungers for disengaging the latch from the carriage.

In testimony whereof I affix my signature, in the presence of two witnesses.

WILLIAM M. ROOP.

Witnesses:
F. G. Fischer,
M. Cox.

Copies of this patent may be obtained for five cents each, by addressing the "Commissioner of Patents, Washington, D. C."